United States Patent [19]

Threlkel

[11] Patent Number: 5,177,047
[45] Date of Patent: Jan. 5, 1993

[54] HIGH ACTIVITY RESID CATALYST

[75] Inventor: Richard S. Threlkel, El Cerrito, Calif.

[73] Assignee: Chevron Research and Technology Company, San Francisco, Calif.

[21] Appl. No.: 770,008

[22] Filed: Oct. 2, 1991

[51] Int. Cl.⁵ .......... B01J 21/04; B01J 23/24; B01J 27/02; B01J 27/24
[52] U.S. Cl. .......... 502/200; 502/219; 502/222; 502/228; 502/229; 502/323
[58] Field of Search .......... 502/314, 315, 323, 200, 502/219, 222, 228, 229

[56] References Cited

U.S. PATENT DOCUMENTS

| | | | |
|---|---|---|---|
| 3,769,239 | 10/1973 | Juguin et al. | 502/323 |
| 4,341,625 | 7/1982 | Tamm | 502/315 |
| 4,395,329 | 7/1983 | Le Page et al. | 502/315 |
| 4,495,308 | 1/1985 | Gibson | 502/314 |

Primary Examiner—Carl F. Dees

[57] ABSTRACT

A catalyst, and method of preparing and using a catalyst, for the hydrodesulfurization of metal-containing heavy feedstocks, which has improved catalytic activity. The catalyst contains Group VIB and Group VIII metals or metal compounds on a support comprising alumina wherein the support has 70 volume percent of its pore volume in pores having a diameter of between 70 and 130 Å.

12 Claims, 3 Drawing Sheets

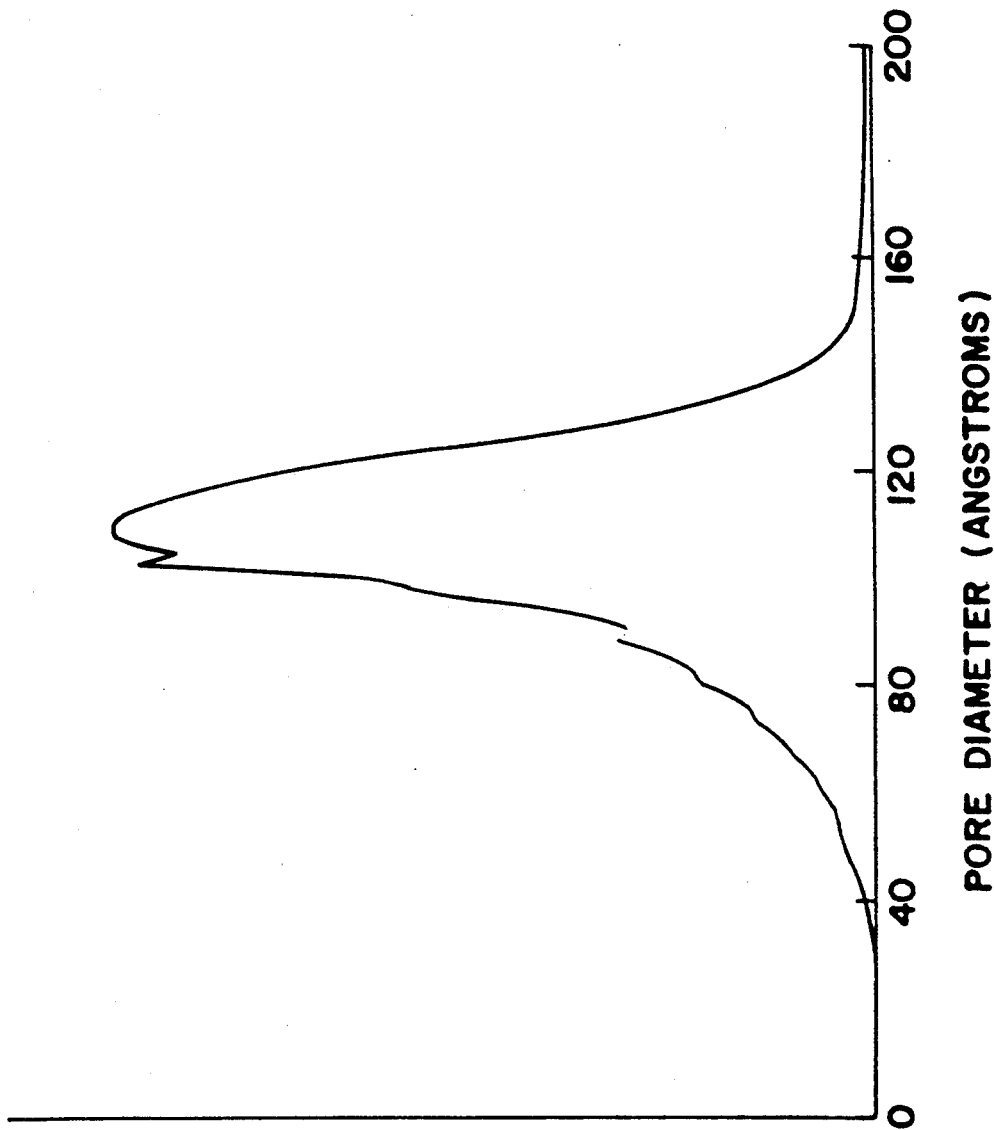

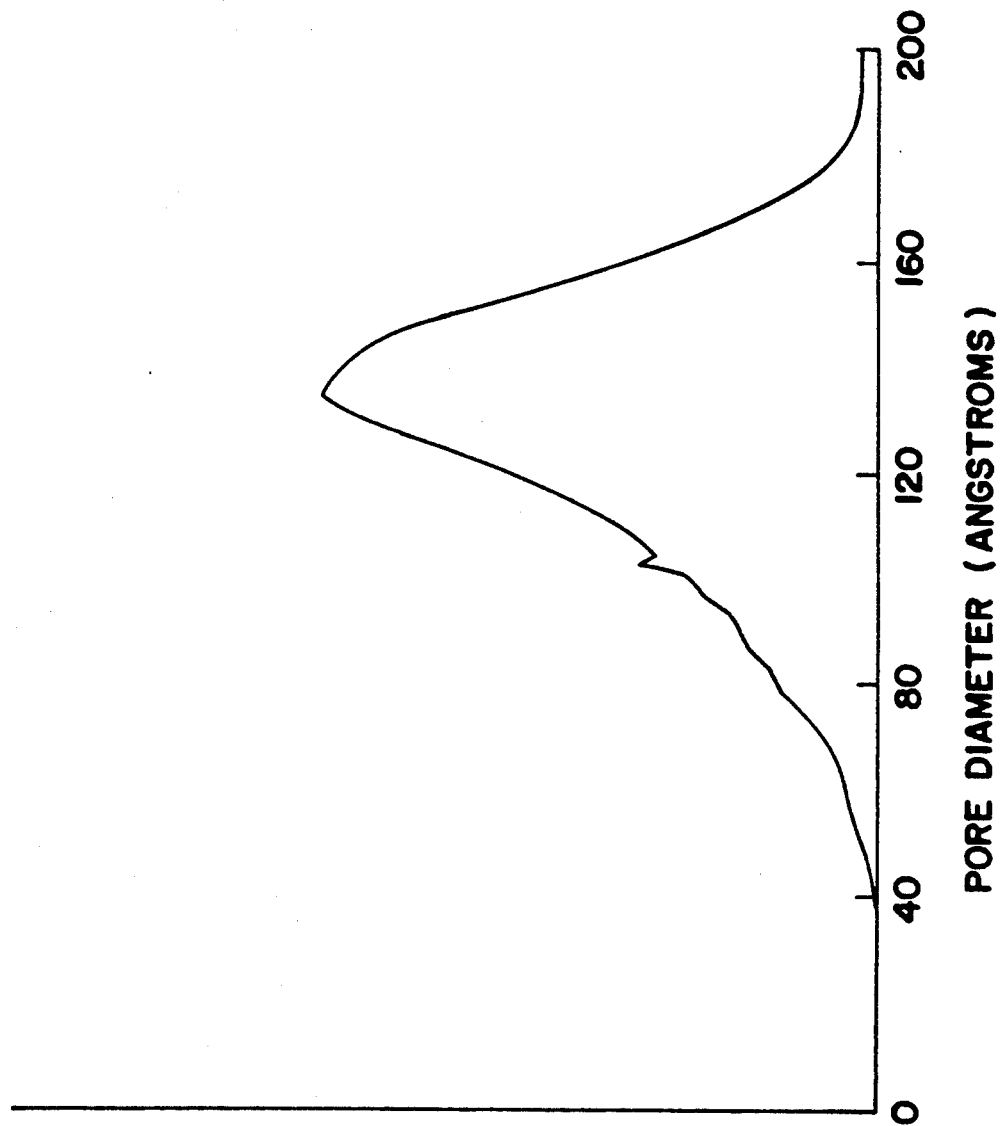
FIG_2

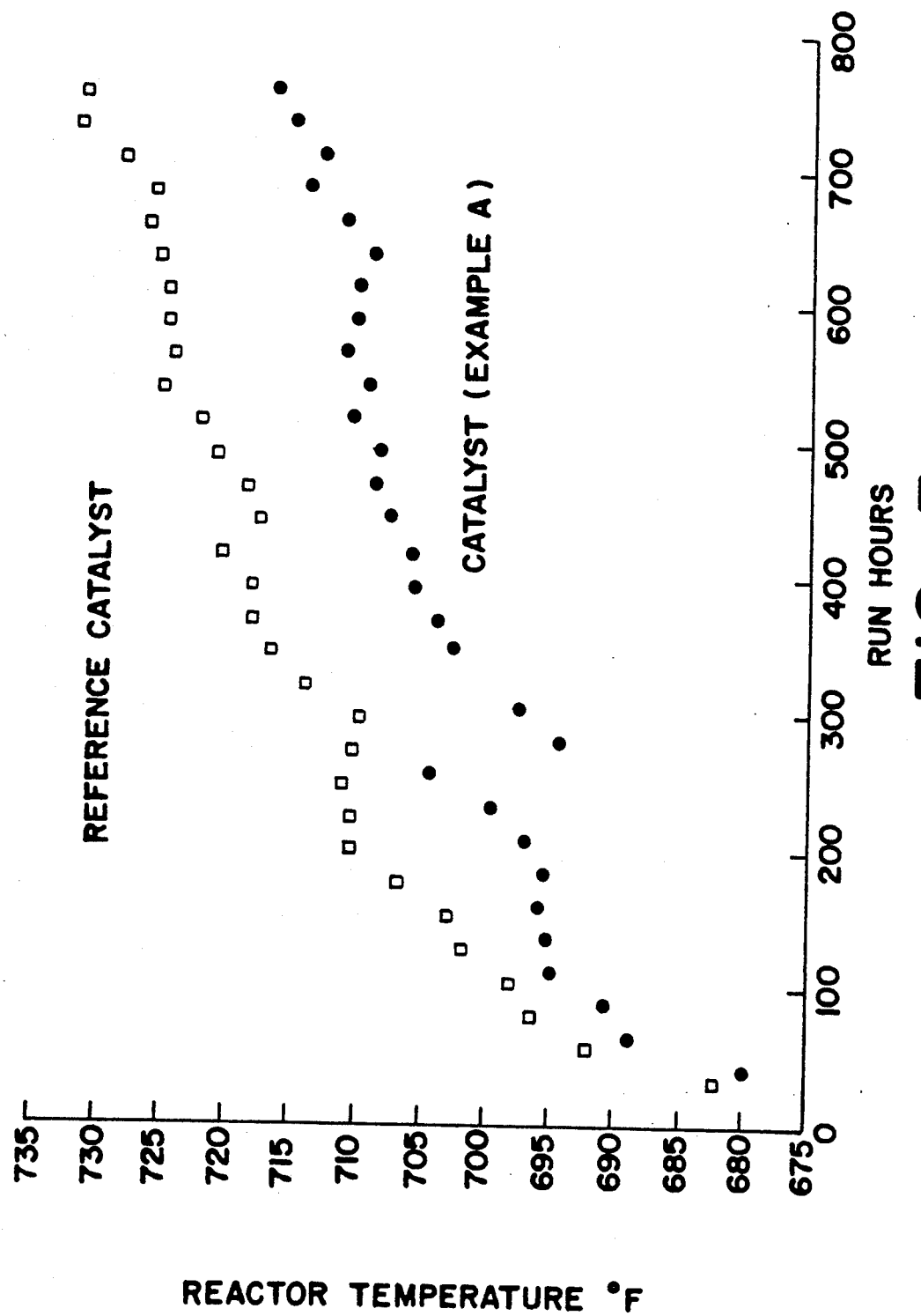

HIGH ACTIVITY RESID CATALYST

BACKGROUND OF THE INVENTION

The present invention relates to a method for the preparation of a catalyst carrier, to a hydrocarbon desulfurization catalyst prepared using the carrier, and to a process for hydrodesulfurizing a hydrocarbon feedstock using the aforementioned catalyst. More particularly, it relates to a method for the preparation of a porous catalyst substantially free of macropores (those having diameters above 1000 Å), and containing at least one metal and/or metal compound of Groups VIB and VIII of the elements. Still more particularly, it relates to a catalyst which comprises a predominantly alumina carrier component which is substantially free of macropores, has a particular micropore size distribution, and contains the aforementioned metal and/or metal compounds. It also relates to a hydrocarbon hydrodesulfurization process using the catalyst.

The pressing need for desulfurizing hydrocarbon oils obtained from petroleum processing is well known. When these stocks are combusted as a fuel in the usual manner, the sulfur present in the hydrocarbon becomes a serious pollutant of the atmosphere in the form of sulfur oxide gases.

Typical operating conditions for hydrodesulfurization processes include a reaction zone temperature of 600° F. to 900° F., a pressure of 200 to 3000 psig. a hydrogen feed rate of 500 to 15000 SCF per barrel of oil feed, and a catalyst such as nickel or cobalt and molybdenum or tungsten on a porous refractory support.

A problem which has been recognized in the case of hydrodesulfurization of heavy oils is that if the heavy oil contains organometallic compounds, the effective catalyst activity tends to decline relatively rapidly, particularly when the impurity is more than about 10 to 20 ppm metals such as dissolved nickel and vanadium. These metallic impurities are said to deposit on the surface and in the pores of the hydrodesulfurization catalyst.

An approach to this problem of metals impurity deactivation of hydrodesulfurization catalyst has been to alter the pore structure of the catalyst. However, the answer as to what pore structure is best has not been easily obtained, and in fact there remains a conflict in the answer suggested by the prior art. U.S. Pat. Nos. 4,066,574; 4,113,661; and 4,341,625, hereinafter referred to as Tamm '574, Tamm '661, and Tamm '625, the contents of which are incorporated herein by reference as if fully set forth in ipsis verbis, have discussed the conflict in the art and suggested a solution.

Tamm's patents disclose that heavy oil feedstocks containing metals, particularly residuum feedstocks, are hydrodesulfurized using a catalyst prepared by impregnating Group VIB and Group VIII metals or metal compounds into a support comprising alumina wherein the support has at least 70% of its pore volume in pores having a diameter between 80 and 150 Å. An especially outstanding hydrodesulfurization catalyst, in terms of very low deactivation rate, is attained by using an alumina support of the above pore size distribution.

In Tamm '661 the catalyst is prepared by taking a predominantly alpha-alumina monohydrate, sized in the range below 500 microns, and treating it with a particular amount of monobasic acid. The acid and the resulting mixture is then at least partially neutralized by admixing with an aqueous solution of a nitrogen base such as aqueous ammonia. The solution contains 0.6 to 1.2 equivalents of base per equivalent of acid. The treated and neutralized product is converted into a catalyst carrier by shaping as desired, drying, and calcining. Finally, the catalyst support is impregnated with the aforementioned metals.

It would be advantageous if the catalysts and processes of Tamm '574, '661 and '625 could be improved by imparting greater catalytic activity to the catalyst over a longer period of time.

SUMMARY OF THE INVENTION

According to the present invention, a process is provided for hydrodesulfurizing a hydrocarbon feedstock containing metals which comprises contacting the feedstock under hydrodesulfurization conditions with a catalyst prepared by impregnating Group VIB and Group VIII metals or metal compounds into a support comprising alumina wherein the support has at least 70 volume percent of its pore volume in pores having a diameter of between 70 and 130 Å. The total pore volume of the support is in the range of from about 0.5 to about 1 cubic centimeters per gram, less than 5% of said pore volume is in pores having a diameter above 300 Å, and less than 2% of the pore volume is in pores having a diameter above 1000 Å.

The present invention is based on the finding that an unexpectedly active catalyst is obtained from the small change in pore size distribution. In another aspect of this invention, the distinctive pore size distribution is obtained by an improvement in the method of making the catalyst support. In particular, the support is prepared by:

(a) treating a peptizable particulate solid comprising predominantly alpha-alumina monohydrate by admixing the solid with an aqueous acidic solution to a pH in the range of about 3.0 to 4.5;

(b) neutralizing at least a portion of the admixed acid by admixing into the treated solid an aqueous solution of a nitrogen base containing an amount of base in the range of from about 0.2 to 0.5 equivalents per equivalent of said acid;

(c) shaping the neutralized or partially neutralized solid; and (d) completing the support by drying and calcining the shaped solid at a temperature in the range of about 150° F. to 1700° F.

In another aspect of this invention, the back-neutralization is decreased in number of nitrogen base equivalents of peptizing acid, and the calcination temperature is reduced, in comparison with Tamm '661, to produce a smaller pore catalyst which is more active for resid conversion, than the catalyst of the prior art. The catalyst of the present invention produces a vacuum gas oil of superior quality, i.e., lower nitrogen. It is particularly useful with feedstocks of comparatively lower metals content.

BRIEF DESCRIPTION OF THE FIGURES

FIG. 1 shows the pore diameter distribution of the catalyst of the present invention.

FIG. 2 shows the pore diameter distribution of a prior art catalyst.

FIG. 3 shows the reactor temperature required to do 55% microcarbon residue (MCR) conversion at 0.35 liquid hourly space velocity feed rate of 760° F.+ Arab heavy atmospheric resid.

DETAILED DESCRIPTION OF PREFERRED EMBODIMENTS OF THE INVENTION

The catalytic process of the present invention is basically directed to residuum feedstocks as opposed to gas-oil feedstocks. Residua typically have greater than 10 ppm metals, whereas gas-oils nearly always have less than 10 ppm metals content. Thus, typical feedstocks for the present invention are crude oil atmospheric distillation column bottoms (reduced crude oil or atmospheric column residuum), or vacuum distillation column bottoms (vacuum residua). The metals are believed to be present as organometallic compounds, possibly in porphyrin or chelate-type structures, but the concentrations of metals referred to herein is calculated as parts per million pure metal.

Alumina is the preferred support material of the catalyst used in the process of the present invention, although alumina may be combined with other refractory support materials such as silica or magnesia.

The alpha-alumina monohydrate preferably used in the present invention is available from a variety of commercial sources, such as Catapal or Versal. It may also be prepared as described in Tamm '661.

The support material comprising alumina must have the previously mentioned pore size distribution to give a catalyst in accordance with the requirements of the present invention. The pore size distribution for the alumina support used to form the finished catalyst is substantially similar to the finished catalyst pore size distribution since there is little change in pore size distribution upon impregnating the support with Group VIB and Group VIII metal compounds. Relatively pure alumina is available from several sources as spray-dried, amorphous or crystalline hydrate powders. These materials are suitable for extrusion when mixed with water only after the addition of an extrusion aid. Two commonly used aids are a strong mineral acid or a combustible organic lubricant. The former usually leads to high density extrudates and the latter leads to pore size distributions containing substantial micropore volume, neither of which is acceptable in a residuum desulfurization catalyst support in accordance with the present invention. The patents of Tamm, previously incorporated herein, disclose a procedure by which such a material can be used to obtain a moderate to low density alumina having greater than 97%, usually greater than 99%, of its pore volume in the micropore region. That is in the region of pore diameters less than about 500 Å.

In the present invention the process of the Tamm patents is improved by a specific method of manufacture improvement which shifts the pore size distribution from 70% of the pore volume in pores having a diameter of between 80 and 150 Å to a pore size distribution in which 70% of the pore volume is in pores having a diameter of between 70 and 130Å. As pointed out in Tamm '661, the acid treated particulate solid alumina monohydrate is partially neutralized by admixing into the treated solid an aqueous solution of nitrogen base containing an amount of base in the range of from about 0.6 to 1.2 equivalents per equivalent of previously added acid. This process is sometimes known as "back-titration". It is an aspect of the present invention that the back-titration is carried out with a solution of nitrogen base, containing an amount of base in the range of from about 0.2 to 0.5 equivalents per equivalent of said previously added acid.

In order to produce an alumina support or carrier having a pore size distribution in accordance with that required by the present invention, the alumina must be treated with a suitable monobasic acid, preferably nitric acid, or its equivalent, as heretofore described (Tamm '661), e.g., hydrochloric, hydrofluoric and hydrobromic acids.

As was recognized the acid treated alumina is satisfactory for the production of a finished carrier substantially free of macropores. However, it is not satisfactory for the production of a catalyst carrier with appropriate pore volume for use in the preparation of residuum desulfurization catalyst. A satisfactory residuum desulfurization catalyst carrier and catalyst should have a pore volume of at least about 0.5 cc/gm, preferably at least 0.65 cc/gm. In general, the higher the pore volume, provided that the micropore distribution and macropore content are satisfactory, the longer is the catalyst life. In order to achieve a useful pore volume and to provide a suitable micropore distribution as required for the finished carrier and catalyst, an appreciable fraction of the admixed acid in the treated feed must be neutralized with a nitrogen base which has been thoroughly admixed into the feed by intensive mixing.

By "nitrogen base" as used herein is meant a base of the formula: $R_3N$ and the corresponding hydroxide form, $R_3HNOH$, wherein the R groups are the same or different and are selected from the group consisting of hydrogen and of alkyl groups having a carbon atom content in the range of from 1 to 3, inclusive. Aqueous ammonia is preferred.

The prior art recommends that "ordinarily, for each equivalent of the acid employed in the treatment, at least about 0.6 equivalent of the base is required". The prior art contends that the use of a large relative amount of the base for neutralization is increasingly beneficial up to a point. Thereafter, the use of a larger relative amount is undesirable. According to Tamm '661 excellent results in terms of the finished carrier are obtained, in general, when the relative amount of the base in the aqueous solution per equivalent of the acid is in the range of about 0.6 to 1.2 equivalents, and when this ratio is about 1.6, the resulting carrier is usually unsatisfactory.

It is the finding of the present invention, that for an improved high activity resid catalyst, the relative amount of the base in the aqueous neutralization solution per equivalent of the acid should be in the range from about 0.2 to 0.5 equivalents, preferably more than about 0.35 equivalents per equivalent of acid.

The nature of the mixture resulting from the neutralization of the treated alumina varies, depending upon its volatiles content. It may be a flowable solid or a viscous paste. In the preferred form required for use as an extrusion feed, it is a flowable solid having a volatiles content in the range of from 50 to 70 wt. %. The term "volatile" as used herein is the material evolved during the high temperature $\geqq$ 900° F. drying. A variety of shaping methods may be employed for forming the precursor of the catalyst carrier from the treated and neutralized solid. Preferably, the shaping is affected by extruding. In the production of the finished carrier, drying and calcining steps of the present method are in general carried out at temperatures in the range from about 150° F. to 1700° F., preferably in the range of 1050° F. to 1700° F. The drying step is typically carried out in the range of from about 150° F. to 500° F. and following the drying the calcination is carried out in a dry or humid atmosphere at a temperature in the range of from about 500° F. to 1700° F., preferably 1050° F. to 1700° F., most preferably less than 1400° F.

The present method results in the production of moderate to low density, predominantly alumina, catalyst carriers having preferably greater than about 98% of their pore volume in the micropore region; and in particular, having at least 70% of the total pore volume in pores having a pore diameter in the range between 70 and 130 Å, less than 5% of the total pore volume in pores having a diameter above 300 Å, and less than 2% of pores having a pore diameter above 1000 Å. Table I presents a typical distribution of the pore volume among the pore diameters in a prior art catalyst described by Tamm '661, '574, and '625. Table II presents a typical pore volume distribution amongst the pore diameters of a catalyst of the present invention.

Pore volume as described here is the volume of a liquid which is adsorbed into the pore structure of the sample at saturation vapor pressure, assuming that the adsorbed liquid has the same density as the bulk density of the liquid. The liquid used for this analysis was liquid nitrogen. The procedure for measuring pore volumes by nitrogen physisorption is further laid out in D. H. Everett and F. S. Stone, *Proceedings of the Tenth Symposium of the Colston Research Society*, Bristol, England: Academic Press, March 1958, pp. 109-110.

TABLE I

| PORE DIAMETER (ANG.) | CUM. PORE VOL. (%) | PORE VOL. (EST.) (CC/GM) |
| --- | --- | --- |
| 1000.00 | 0.009 | 0.0001 |
| 900.00 | 0.029 | 0.0002 |
| 800.00 | 0.065 | 0.0005 |
| 700.00 | 0.119 | 0.0010 |
| 600.00 | 0.192 | 0.0015 |
| 500.00 | 0.295 | 0.0024 |
| 400.00 | 0.410 | 0.0033 |
| 300.00 | 0.717 | 0.0058 |
| 250.00 | 1.021 | 0.0082 |
| 240.00 | 1.111 | 0.0090 |
| 230.00 | 1.230 | 0.0099 |
| 220.00 | 1.436 | 0.0116 |
| 210.00 | 1.705 | 0.0137 |
| 200.00 | 2.129 | 0.0172 |
| 190.00 | 2.680 | 0.0216 |
| 180.00 | 3.548 | 0.0286 |
| 170.00 | 6.088 | 0.0491 |
| 160.00 | 12.180 | 0.0982 |
| 150.00 | 23.636 | 0.1905 |
| 140.00 | 39.950 | 0.3220 |
| 130.00 | 57.483 | 0.4634 |
| 120.00 | 71.144 | 0.5735 |
| 110.00 | 80.589 | 0.6496 |
| 100.00 | 87.513 | 0.7054 |
| 95.00 | 90.229 | 0.7273 |
| 90.00 | 92.480 | 0.7455 |
| 85.00 | 94.451 | 0.7614 |
| 80.00 | 96.096 | 0.7746 |
| 75.00 | 97.430 | 0.7854 |
| 70.00 | 98.426 | 0.7934 |
| 65.00 | 99.166 | 0.7994 |
| 60.00 | 99.708 | 0.8038 |
| 55.00 | 100.146 | 0.8073 |
| 50.00 | 100.430 | 0.8096 |
| 45.00 | 100.564 | 0.8107 |
| 40.00 | 100.640 | 0.8113 |
| 35.00 | 100.686 | 0.8116 |
| 30.00 | 100.535 | 0.8104 |
| 25.00 | 100.359 | 0.8090 |

TABLE II

| PORE DIAMETER (ANG.) | CUM. PORE VOL. (%) | PORE VOL. (EST.) (CC/GM) |
| --- | --- | --- |
| 1000.00 | 0.034 | 0.0003 |
| 900.00 | 0.058 | 0.0004 |
| 800.00 | 0.080 | 0.0006 |
| 700.00 | 0.109 | 0.0008 |
| 600.00 | 0.164 | 0.0012 |
| 500.00 | 0.232 | 0.0017 |
| 400.00 | 0.324 | 0.0024 |
| 300.00 | 0.530 | 0.0039 |
| 250.00 | 0.752 | 0.0055 |
| 240.00 | 0.812 | 0.0059 |
| 230.00 | 0.883 | 0.0065 |
| 220.00 | 0.985 | 0.0072 |
| 210.00 | 1.097 | 0.0080 |
| 200.00 | 1.249 | 0.0091 |
| 190.00 | 1.451 | 0.0106 |
| 180.00 | 1.681 | 0.0123 |
| 170.00 | 1.989 | 0.0145 |
| 160.00 | 2.393 | 0.0175 |
| 150.00 | 2.997 | 0.0219 |
| 140.00 | 4.310 | 0.0315 |
| 130.00 | 9.386 | 0.0686 |
| 120.00 | 25.123 | 0.1837 |
| 110.00 | 50.454 | 0.3690 |
| 100.00 | 73.714 | 0.5391 |
| 95.00 | 80.758 | 0.5906 |
| 90.00 | 85.335 | 0.6240 |
| 85.00 | 89.292 | 0.6530 |
| 80.00 | 92.350 | 0.6753 |
| 75.00 | 94.675 | 0.6923 |
| 70.00 | 96.514 | 0.7058 |
| 65.00 | 97.877 | 0.7158 |
| 60.00 | 98.808 | 0.7226 |
| 55.00 | 99.489 | 0.7276 |
| 50.00 | 100.013 | 0.7314 |
| 45.00 | 100.381 | 0.7341 |
| 40.00 | 100.605 | 0.7357 |
| 35.00 | 100.684 | 0.7363 |
| 30.00 | 100.693 | 0.7364 |
| 25.00 | 100.475 | 0.7348 |

The hydrocarbon hydrodesulfurization catalysts of the present invention contain at least one hydrogenation agent, and preferably contain a combination of two such agents. The metals and/or the compounds of the metals, particularly the sulfides and oxides of Group VIB (especially molybdenum and tungsten) and Group VIII (especially cobalt and nickel) of the elements are in general satisfactory catalytic agents, and are contemplated for use with substantially macropore-free carriers produced by the method of the present invention. The combinations of cobalt, nickel and molybdenum catalytic agents are preferred.

The catalytic agents required for the present catalyst compositions may be incorporated into the calcined carrier by any suitable method, particularly by impregnation procedures ordinarily employed in general in the catalyst preparation art. It has been found that an especially outstanding catalyst is made when the alumina used not only has the pore size distribution required in accordance with the present invention, but also wherein the catalyst is made by a single step impregnation of the alumina using a solution of a cobalt or nickel salt and a heteropolymolybdic acid, for example, phosphomolybdic acid.

The following examples illustrate the preparation of the catalyst of the present invention.

EXAMPLES

Example A

Preparation of the Catalyst Support

An alumina feedstock consisting of 60% Catapal alumina and 40% Versal 250 alumina was peptized with 7.6% nitric acid, and back-neutralized with 35% ammonium hydroxide, 63% volatiles by weight were present. Specifically, 1260 gms of Catapal and 840 gms of Versal on a volatiles-free basis were maintained at a temperature between 130° F. and 140° F., mixed together with 228 gms of concentrated nitric acid and 1515 gms of deionized water at about 150 cc/min. in a blender for 15 minutes or until pasty. Twenty (20) gms of the paste was slurried in 80 cc of deionized water and the pH recorded as 3.4. Fifty-five (55) gms of concentrated ammonium hydroxide (58 wt. % ammonia hydroxide), was mixed with 1145 gms of deionized water and added to the mixer at the rate of about 150 cc/min. and then mixed for an additional 15 minutes. The volatiles content was 61.9 wt. %. The paste temperature was 133° F. The paste was extruded in a two-inch extruder, using a 0.039 inch cylindrical die. The extrudate was air-dried and heated in an oven at 250° F. for two hours. Then heated at 400° F. for two additional hours. The weight recovered was 2,345.5 gms. The dried extrudate was calcined for one hour at 1400° F. and an air rate of 1 cubic foot per hour of dry air. The finished particles had the following properties. Particle diameter: 0.0318"; particle density: 1.056 gms/cc; total pore volume: 0.6188 cc/gm; surface area: 185 m$^2$/gm. This support material was then impregnated with nickel and molybdenum in the following manner. A mixture of molybdenum oxide dissolved in ammonium was acidified with phosphoric acid to a pH of 2.8, and nickel nitrate hexahydrate was added. The support was impregnated with the mixture to make the catalyst. The catalyst was dried at 250° F. for two hours and at 400° F. for six hours. It was then calcined with 20 cubic feet per hour of dry air for four hours at 450° F., four hours at 750° F. and five hours at 950° F. The finished catalyst contained 8.62 wt. % molybdenum, 3.16 wt. % nickel, and 1.93 wt. % phosphorous. The median pore diameter was 111 Å which is smaller than the prior art catalyst. The surface area was 159 m$^2$/gm. See FIG. 1.

Example B

The catalyst of Example A was compared with the analogously prepared catalyst of the prior art (see Table I and FIG. 2—Tamm '574, '625, '661) in a standard activity test. In this test, the conversion catalyst was charged to a reactor under a layer of standard commercial demetallation catalyst, and both catalysts were presulfided using dimethyl disulfide. They were then contacted with a 760° F.+ Arabian Heavy residuum at 0.35 LHSV and 2000 psi total pressure and with a 5000 SCF/bbl once-through hydrogen flow. The layered catalyst system was tested at a range of temperatures between 700° F. and 750° F. and at a range of feed rates between 0.35 hr$^{-1}$ LHSV and 0.50 hr$^{-1}$ LHSV over 750 hours. Liquid product stripped of light gas from the reaction was tested for microcarbon residue (MCR) as defined by ASTM D4530-85. FIG. 3 shows the calculated temperature required to maintain 55% MCR conversion. According to the results shown in FIG. 3, the catalyst of this invention was significantly more active than the reference catalyst, as shown by the lower reactor temperature required to maintain the target MCR conversion.

What is claimed is:

1. A catalyst composition having improved activity in the hydrodesulfurization of heavy oils, comprising:
   an alumina support; and
   a Group VIB component and a Group VIII component selected from the group consisting of the metals, oxides, and sulfides of the elements of Groups VIB and VIII;
   wherein said support has a pore volume in the range of about 0.5 to about 1.1 cubic centimeters per gram, and has at least 70% of said pore volume in pores having a diameter between 70 and 130 Å, less than 5% of said pore volume in pores having a diameter above 300 Å, and less than 2% of said pore volume in pores having a pore diameter above 1000 Å.

2. A method for preparing a high activity catalyst for the hydrodesulfurization of heavy oils which comprises: impregnating a porous support with an aqueous solution containing at least one catalytic agent or catalytic agent precursor selected from the group consisting of Group VIB and Group VIII compounds, said compounds being thermally decomposable to the metal oxides, and thereafter drying and calcining the resulting impregnated support, said support having been prepared by:
   (a) treating a peptizable particulate solid comprising predominately alpha-alumina monohydrate by admixing the solid with an aqueous acidic solution to a pH in the range of about 3.0 to 4.5;
   (b) neutralizing at least a portion of the admixed acid by admixing into the treated solid an aqueous solution of a nitrogen base containing an amount of base in the range of about 0.2 to about 0.5 equivalents per equivalent of said acid;
   (c) shaping the neutralized or partially neutralized solid; and
   (d) completing the support by drying and calcining the shaped solid at a temperature in the range of about 150° F. to 1700° F.;
   wherein said support has a pore volume of at least 0.5 cubic centimeters per gram of which at least 70% of said pore volume in pores having a pore diameter in the range between 70 and 130 Å, less than 5% of said pore volume in pores having a diameter above 300 Å, and less than 2% of said pore volume in pores having a pore diameter above 1000 Å.

3. A catalyst according to claim 1 or 2 wherein said catalyst has at least 80% of said pore volume in pores having a diameter between 70 to 130 Å.

4. A catalyst according to claim 1 or 2 wherein said catalyst is further characterized in that said Group VIB and Group VIII compounds are selected from the group consisting of compounds of cobalt, nickel and molybdenum.

5. A catalyst according to claim 1 or 2 wherein less than 5% of said pore volume is in pores having a diameter greater than 140 Å.

6. A catalyst according to claim 1 or 2 wherein pores having a diameter above 1000 Å constitute less than 1% of said pore volume.

7. A method to claim 2 wherein said acidic solution is selected from acidic solutions of nitric, hydrochloric, hydrofluoric and hydrobromic acids.

8. A method according to claim 2 wherein said alpha-alumina monohydrate is sized in the range below about 500 microns.

9. A method according to claim 2 wherein said nitrogen base has the formula $R_3N$ or $R_3NHOH$, wherein all groups are the same or different and are selected from the groups consisting of hydrogen and alkyl groups having a carbon atom content in the range of 1 to 3 inclusively.

10. A method according to claim 2 wherein said aqueous solution is a solution of a cobalt or nickel salt and a heteropolymolybdic acid and said impregnation is effected in a single step.

11. A catalyst according to claim 1 or 2 wherein said catalyst is further characterized in that said catalyst contains nickel and molybdenum in about 3 and 9 wt. %, respectively.

12. A method according to claim 2 wherein said solution of a nitrogen base contains an amount of base less than about 0.35 equivalents per equivalent of said acid.

* * * * *